US007803454B2

(12) United States Patent
Toepel

(10) Patent No.: US 7,803,454 B2
(45) Date of Patent: Sep. 28, 2010

(54) LASER TEST CARD

(75) Inventor: Michael P. Toepel, Pittsfield, NH (US)

(73) Assignee: Zap - It Corporation, Andover, NH (US)

( * ) Notice: Subject to any disclaimer, the term of this patent is extended or adjusted under 35 U.S.C. 154(b) by 1130 days.

(21) Appl. No.: 10/744,127

(22) Filed: Dec. 24, 2003

(65) Prior Publication Data

US 2005/0142344 A1 Jun. 30, 2005

(51) Int. Cl.
*B32B 7/02* (2006.01)

(52) U.S. Cl. .................... 428/213; 428/220; 428/195.1; 428/215; 428/913

(58) Field of Classification Search .............. 428/195.1, 428/213, 215, 913, 220
See application file for complete search history.

(56) References Cited

U.S. PATENT DOCUMENTS 4,623,896 A 11/1986 Hauslein
5,055,695 A * 10/1991 Lange ..................... 250/459.1
5,256,463 A * 10/1993 Osaka et al. .................. 428/77
5,464,960 A * 11/1995 Hall et al. ................ 219/121.6
5,631,767 A * 5/1997 Dodge et al. ................ 359/328
5,897,938 A * 4/1999 Shinmoto et al. ........... 428/354
6,228,555 B1 5/2001 Hoffend, Jr. et al.
6,461,786 B1 10/2002 Sasaki et al.
6,541,420 B2 4/2003 Yamamoto et al.

FOREIGN PATENT DOCUMENTS

EP 1 179 577 A1 * 2/2002

OTHER PUBLICATIONS www.zap-it.com Home Page: Laser alignment burn paper.

* cited by examiner

*Primary Examiner*—Betelhem Shewareged
(74) *Attorney, Agent, or Firm*—Joanne M. Martin

(57) ABSTRACT

A laser test card according to the present invention comprising a thin planar multi-layer material, which may be cut to a desired length and width, is exposed to a beam directed to the laser test card top surface from a laser under test, and reveals successive visibly contrasting layers under the top surface according to the incident laser beam energy at that particular point or any point of the X or Y dimension (cross-section) of the beam. In the preferred embodiment, several different layers of sharply different colors are used.

12 Claims, 1 Drawing Sheet

LASER TEST CARD

FIELD OF THE INVENTION

The present invention relates to laser system test and set-up apparatus, in particular, to laser test material which change in appearance according to incident laser radiation.

BACKGROUND OF THE INVENTION

The critical alignment of laser systems focuses primarily on output beam power and energy distribution across the output beam width (beam dispersion). Prior measurement is primarily performed with electronic measurement equipment interposed between the laser and its target. Obviously, in systems having a laser integrated therein, it is often not convenient or even possible to insert measurement or alignment equipment. In some systems, testing and/or alignment measurement is simply avoided as long as the system is apparently functional, not being measured to see how close to marginal performance the laser may be. Moreover, with more powerful lasers, the beam intensity may cause accidental injury to a careless technician, inappropriate application of the beam for medical procedures or industrial manufacturing processes, and if measurement is not convenient, such laser monitoring and servicing is avoided due to personal safety concerns.

SUMMARY OF THE INVENTION

The laser test card according to the present invention comprises a thin planar multi-layer material, which may be cut to a desired size, is exposed to a beam directed to the laser test card top surface from a laser under test, and reveals successive visually contrasting layers from the top surface down to the supporting board according to the incident laser beam energy at that particular point or any point of the X or Y dimension (i.e. shape) of the beam. In the preferred embodiment, several different layers of sharply differently colors of high contrast are used.

Accordingly, the laser test card so constructed and used provides a beam energy profile across its width as well as an indication of its approximate energy. Thus, the present invention provides a quick, easy, safe and inexpensive laser and laser system test device giving a relative energy distribution within the beam.

BRIEF DESCRIPTION OF THE DRAWING

These and further features of the present invention will be better understood by reading the following Detailed Description together with the Drawing, wherein.

DETAILED DESCRIPTION OF THE INVENTION

Figure 1:
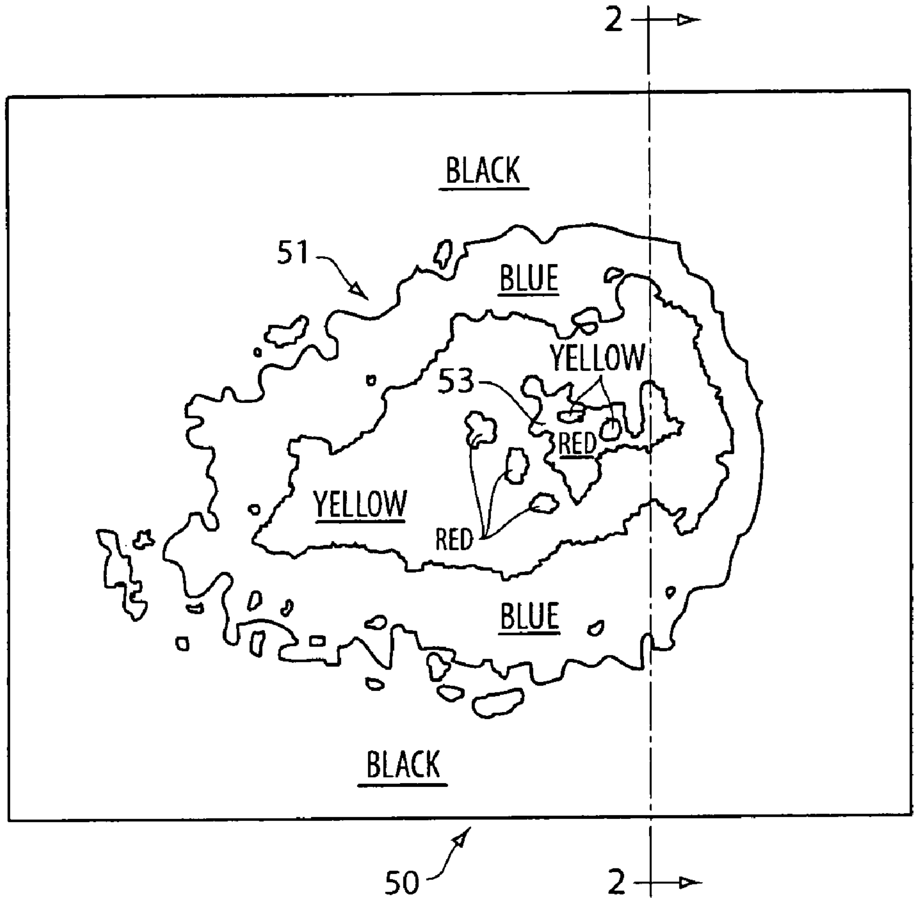
FIG. 1 is an enlarged plan view of a typical laser test card according to the present invention after exposure to a laser under test.

The laser test card 50 according to the present invention is shown in FIG. 1, having a typical laser exposure pattern 51 thereon. In the embodiment 50, an exemplary laser test card comprises 4 different colored layers, including an optional black top layer, and successively underlying blue, yellow and red layers deposited on a carrier board (not shown). Also not visible in FIG. 1 are individual clear layers which may be deposited between each adjacent pair of colored layers. The pattern 51 is shown for a beam from a laser at 1,064 nm wavelength and 100 mW beam power. The illustration of the pattern 51 is larger than actually produced, that being approximately 0.3 inches across.

Figure 2:
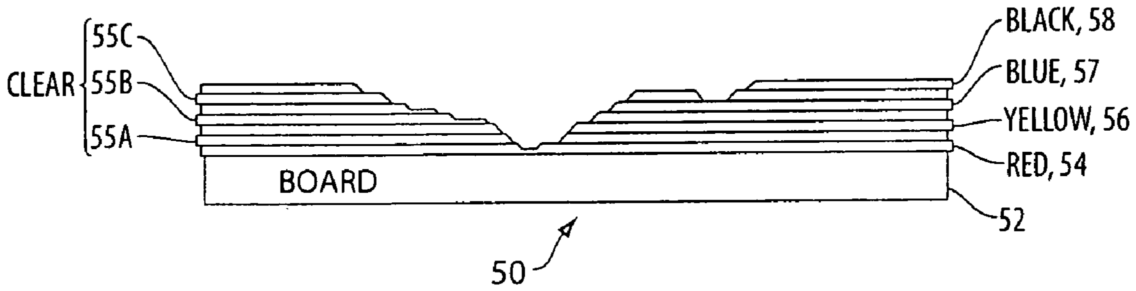
FIG. 2 is an elevation view of a cross section the laser test card of FIG. 1 showing the various layers thereof and the effect of the incident laser radiation.

A more structurally revealing, cross-section view of the laser test card 50 is provided in FIG. 2, wherein the supporting board 52, may comprise a variety of material being largely a matter of choice as long as it is compatible with the overlaying layers and provides the desired physical (rigidity, easily cut, etc.) characteristics. In the present embodiment of FIG. 2, the board 52 comprises an 80 pound paper. The first layer 54 is a red layer of printer's ink, e.g. red #MP-103 ink made by Dezyne MP series, deposited with a selected thickness, such as 0.00025 inches in this typical embodiment. The next layer 55A comprises a clear ink, e.g. #MP-135 made by Dezyne MP series deposited on the red layer 54. Over the clear layer 55A, a yellow layer 56 is deposited 0.00025 inches thick comprising a yellow #MP-132 ink made by Dezyne MP series, and again covered by a clear ink layer 55B. A blue layer 57 (blue #MP-906 manufactured by Dezyne MP series is then deposited 0.00025 inches thick over the preceding clear layer, to be followed by another clear layer 55C. In this embodiment, the clear layers are also 0.00025 inches thick. An optional final black ink layer 58 of (black #MP-111 manufactured by Dezyne MP series of 0.00025 inches thickness is deposited over the preceding clear layer 55C. An alternate embodiment has ink layers 54-58 of 0.0007714 inch thickness for the ink types described. Moreover, the thickness of the inks may be varied anywhere with in the range of 0.00025 to 0.0007714 to provide the desired power indications, that is, the thicker (or more radiation resistant) the layer receiving the beam energy, the greater the range of power needed to reveal the underlying layer color, pattern, etc. Further embodiments of the present invention envision one or more layer thicknesses in the range 0.0001 to 0.010 inch.

Returning to the laser exposure pattern 51 of FIG. 1, the two-dimensional image of pattern 51 is highly revealing of the laser output beam energy and beam distribution. For instance, pattern 51 is asymmetric. A more pronounce beam "edge" or rapid intensity change (vs-distance) is demonstrated from the right of the section line 2 by the closer spacing of bands of the different colors. A region of highest laser beam intensity 53 is indicated as centered approximately within a red region of FIG. 1 (reveal portion of the red layer 54). By contrast, a more gradual reduction in laser energy can be seen to the left of the section line 2, indicating a more unfocussed beam. Moreover, if the incident laser beam is "scanned" across the laser test card 50, variations in laser power-vs-time (e.g. Amplitude Modulation, beam turn-on or turn-off characteristics) may be demonstrated.

In the embodiment 50 of FIGS. 1 and 2, the ink thicknesses are approximately equal and of approximately equal responsiveness (for evaporation or other removal mechanism) to laser energy, yielding a substantially linear laser energy to number-of-colors interpretation. Alternate embodiments include variations in thickness, color and/or material to yield an energy responsiveness to provide a desired energy to number-of-color (e.g. logarithmic).

Moreover, the above exemplary embodiments comprise layers of common inks, while further embodiments also comprise one or more layers of different materials, e.g. metallic, fast-drying, slow-drying inks and inks or materials deposited without separation layers (i.e. 55A-C). Also, the mechanism in which the layers are reduced and eliminated in response to incident laser beam radiation includes, but is not limited to, vaporization, evaporation, chemical change, and combustion. Furthermore, the materials are deposited in the embodiments of FIGS. 1 and 2 by printing, screening, vapor deposition, and other deposition methods currently available for the materials deposited.

Modifications and substitutions by one of ordinary skill in the art are within the scope of the present invention, which is not to be limited except by the claims which follow.

What is claimed is:

1. A laser test card, comprising:

a support board;

a plurality of laser responsive layers disposed successively on said support board, wherein, each said layer comprises ink reduced in thickness and ultimately removed upon receipt of incident laser energy, revealing a succession of deeper, underlying layers according to incident laser energy received thereon; and a clear ink separation barrier between at least two of said of said layers, wherein said incident laser energy passes through said clear ink separation barrier and continues to reduce the thickness of the laser responsive layers disposed underneath said clear ink separation barrier.

2. The laser test card of claim 1, wherein at least one said layer comprises one of printer's ink, metallic ink, fast-drying ink and slow-drying ink.

3. The laser test card of claim 1, wherein at least one of said layers comprises a printed ink, screened ink and a vapor-deposited ink.

4. The laser test card of claim 3, wherein said layers comprise layers of different thicknesses.

5. The laser test card of claim 1, comprising layers of selective laser radiation sensitivity according to at least one of color, thickness and composition.

6. The laser test card of claim 1, wherein said layers comprise differently colored layers, each color being visible as the overlying layer is removed by the incident laser radiation.

7. The laser test card of claim 6, wherein said layers comprise red, yellow, blue and black colored layers deposited in succession on said board.

8. The laser test card of claim 1, further including a clear layer between at least two of said laser responsive layers.

9. The laser test card of claim 8, wherein at least one layer deposited on said board has a thickness of 0.00025 inch.

10. The laser test card of claim 8, wherein at least one of the layers is 0.0007714 inch thick.

11. The laser test card of claim 8, wherein at least one of the clear and colored layers are in the range of greater than 0.0003 to 0.0007714 inch thick, inclusive.

12. The laser test card of claim 6, wherein the colored layers are in the range of 0.010 to 0.0003 inch thick.

* * * * *